Patented July 16, 1940

2,207,737

UNITED STATES PATENT OFFICE 2,207,737

NONLUMPING CALCIUM SULPHATE CONTAINING COMPOSITION

Franciscus Visser't Hooft, Buffalo, and Hugh B. Hodge, Jr., East Aurora, N. Y., assignors to Lucidol Corporation, Buffalo, N. Y.

No Drawing. Application July 28, 1938, Serial No. 221,794

5 Claims. (Cl. 23—243)

The present invention relates to a process of treating hydrated calcium sulphate ($CaSO_4 2H_2O$), or products containing substantial quantities of hydrated calcium sulphate, particularly compositions containing bleaching agents for flour and the like, to eliminate the tendency of these products to form lumps, especially when subjected to summer temperatures and air of high moisture content.

In the manufacture and use of certain compounds, such as organic compounds to be used in the bleaching of flour, it is desirable, in order to keep such compounds in good condition and to facilitate their mixture with other materials, to incorporate therewith a "filler." It is ordinarily desired to have these compositions in finely divided and free-running form, to enable them to be fed easily and freely and uniformly from any ordinary feeding device. Some of the difficulties encountered in the use of many "fillers" are that under certain conditions they have a tendency to cake, to form lumps and to "arch" and stick in the feeding device. Of these three phenomena, "arching" or sticking in the feeding device may be caused by either caking or lumping. The latter two, however, (i. e. caking and lumping) are distinctly different from each other. When a finely ground material "cakes," a physical or chemical change (such as the addition of water of crystallization) takes place, causing new and larger bodies to be formed from the original particles. These new bodies may take any form from small lumps to large rock-like bodies from which, when broken up, it is practically impossible to regenerate the original free-running and finely ground particles, due to the physical or chemical changes which have taken place. On the other hand, when a finely ground material "lumps," forces of cohesion, assisted by pressure or other outside forces, temporarily bring the individual particles together without distinct physical or chemical change. The agglomerates thus created may take any form from small lumps to large lumps, usually soft and easily broken up, when pressure is applied, thus regenerating the original particles, since no physical or chemical changes have taken place. Both phenomena are caused by changes in moisture, temperature and methods of storage.

One useful filler which, however, has a decided tendency to cake and arch in the feeders is dicalcium phosphate. Visser't Hooft United States Patent No. 2,029,967 describes and claims an improved method of treating dicalcium phosphate to prevent caking and the improved dicalcium phosphate obtained thereby.

Another filler that has shown considerable promise is hydrated calcium sulphate. This material is in many ways admirably suited for this purpose. It does not have the tendency of dicalcium phosphate to "cake," but it has the objectionable tendency to form lumps, i. e. to "lump," and to "arch" and stick in feeders. This tendency of calcium sulphate is sometimes referred to as a "bag bound" condition, which shows up especially when the material is subjected to pressure as in storing bags in piles or in feeders or conveyors where a certain inside pressure may develop. The tendency is especially objectionable under conditions of high temperatures and high humidity. The addition of dry powders, such as talcum or starch, which can be used to prevent caking in materials such as sugar and the like, does not solve the difficulty, and in some cases even makes the calcium sulphate more subject to lumping. Additionally, the use of the customary desiccating agents, such as calcium chloride, sodium sulphate, anhydrous calcium sulphate or magnesium sulphate, is completely unsuccessful.

In commercial use it is highly desirable that calcium sulphate be free-running, nonlumping and nonarching under all summer or winter temperatures and all atmospheric conditions of humidity. A simple test to determine lumping properties of a particular sample can be made by subjecting a known amount of a sifted sample of the material in a small cotton bag to definite pressure under conditions of controlled humidity and temperature for a certain length of time and thereafter determining the percentage of lumps formed in the material by sifting it through a screen of a certain size. Conveniently these tests are made at a pressure of 1 pound per square inch and for a period of 18 hours and then the percentage of lumps remaining on a 20-mesh silk screen determined. For comparative purposes, tests are made at (a) 70° F. and 50% relative humidity, and (b) 100° F. and 90% relative humidity or (c) 100° F. and 80% relative humidity. One sample of calcium sulphate showed 1% lumps after test (a) and 67% lumps after test (c).

It has now been found, in accordance with this invention, that hydrated calcium sulphate of a pure grade, which tends to lump or arch in a hot and moist atmosphere, and is not free-running when tested in the above manner, can be made substantially nonlumping, dry, and free-running by the addition of minor quantities of certain substances which will hereinafter be referred to as "lumping inhibitors."

Hydrated calcium sulphate is not a material which is hygroscopic. In hot moist weather it is not noticeably increased in weight even when the weather is sufficiently hot and moist to cause serious lumping and arching. Nevertheless, it is believed that surface moisture is in some way the cause of the lumping phenomenon in calcium sulphate.

Various chemicals can be used to act in the above capacity as lumping inhibitors. These chemicals generally have a capacity for adsorbing, that is, holding by surface attraction or tension, a large amount of water, without, at the same time, attracting water sufficiently strongly to become deliquescent or dehydrating the hydrate of calcium sulphate itself, that is, removing its water of crystallization. The chemicals which accomplish this result apparently act because of the large amount of water adsorbent surface which they present to the calcium sulphate being acted upon. They should have good hygroscopic properties but they should be non-deliquescent even at high temperatures. Ordinary hygroscopic materials such as calcium chloride which absorb water and become wet are useless as lumping inhibitors.

As a measure of the effectiveness of materials as lumping inhibitors, both positive and negative, it has been found that the Gardner-Coleman method of determining oil absorption for the paint industry, as described in "Physical and Chemical Examination of Paints, Varnishes, Lacquers and Colors" by H. A. Gardner, is highly suitable. This test consists in making successive, small measured additions of raw linseed oil to a weighed sample of the material being tested in a container. After each addition, the dry material is brought into contact with the oil by gentle stirring, not "working," with a spatula. As the dry particles become wet with oil, they form small lumps which, on further additions, join to form one large paste ball. The end point is determined as that point at which addition of one or two drops of oil causes the paste lump to soften and, when stirred, to smear on the container walls.

By substituting water for oil in the above test a figure for water absorption can be obtained. As a rule, this figure is slightly higher but of the same order as the oil absorption figure. If, however, some or all of the water absorbed combines chemically with the material tested, an accurate water absorption figure cannot be obtained, due to formation of hydrates and solutions.

There are not a great many materials which can act as suitable lumping inhibitors for hydrated calcium sulphate. Examples of such materials are alumina hydrate, magnesium carbonate, carbon black, silica gel, certain special grades of calcium carbonate and tribasic calcium phosphate. In all cases the antilumping properties are very much dependent on the oil or water absorption figure found for the particular sample. In general, the material should have an oil absorption value above 80. For example, alumina hydrates with an oil absorption of around 100–200 cc. per 100 grams are found suitable. The higher the oil absorption the more effective the alumina hydrate is as a lumping inhibitor. Magnesium carbonates with an oil absorption of 200–300 cc. per 100 grams are also found suitable and the higher the oil absorption, the higher the efficiency of the sample of magnesium carbonate as a lumping inhibitor. However, in comparing two different materials this parallel between efficiency and oil absorption does not necessarily hold true. Although generally all antilumping agents give a high oil absorption test, the lower one of two chemically and physically different materials may still be the most efficient antilumping agent. This, for instance, holds true for alumina hydrate and magnesium carbonate. Alumina hydrate was found to be more effective than magnesium carbonate and small quantities of alumina hydrate inhibit lumping to as great an extent as somewhat larger quantities of magnesium carbonate.

In many cases chemicals cannot be used in their ordinary form but must be used in the form of a light, fluffy material of low density so as to present a large amount of surface to the calcium sulfate with which it is being mixed. These generally may be or are of a special grade of these chemicals. For example, there has recently been put on the market a calcium carbonate of high oil absorption which will be useful in the present invention. Ordinary calcium carbonate, on the other hand, is not useful since it has low oil and water adsorption possible due to the small amount of surface available, and therefore, of little utility for the present purpose.

As stated previously, hydrated calcium sulphate, if rendered substantially nonlumping, is suitable as a filler for organic flour bleaching compounds. The most widely used of these compounds is benzoyl peroxide, although other peroxides, particularly acyl peroxides, can be used. Many of these compounds are chemically quite reactive, and it is therefore necessary in such cases that the lumping inhibitor used will not react with or promote or cause substantial decomposition of the organic peroxide.

The quantities of lumping inhibitors which it is necessary to incorporate with the calcium sulphate are generally small, amounting to, for example, about 5% of the weight of calcium sulphate present. Even smaller quantities, such as 3% or less, may reduce the lumping tendencies to an extent which is usually ample for most practical purposes. Likewise, larger quantities, such as 10% or more, can, if desired, be used. In all cases, however, the lumping inhibitor will comprise a minor quantity, that is, less than 50%, of the entire composition. The necessary quantity also obviously depends on the degree of oil adsorption of the individual sample and the nature of the chemical used and the temperature and humidity conditions to be guarded against in practice.

Having described the invention the following example of a preferred form is now given:

*Example.*—7.5% of a light, fluffy alumina hydrate of low density having an oil absorption of 175, 72.5% hydrated calcium sulphate, and 20% benzoyl peroxide, is uniformly mixed together such as by grinding in a ball mill. Proper precautions should, of course, be taken to keep the temperature of the mixture below the decomposition temperature of the peroxide. The resulting material is found to be free-running, dry, and nonlumping under conditions of high atmospheric relative humidity and temperature. A lumping test made on this mixture by the methods described previously showed 0.4% lumps at 70° F. and 50% relative humidity after 18 hours, and 1% lumps at 100° F. and 90% relative humidity after 18 hours. When the anti-lumping agent, in this particular case the alumina hydrate, is eliminated and a batch is prepared containing 80% hydrated calcium sulphate and 20% benzoyl peroxide, the lumping tests show 6% lumps at 70° F. and 50% relative humidity after 18 hours and 40 lumps at 100° F. and 90% relative humidity after 18 hours.

If quantities of less than 7.5% of alumina hydrate are used in the above example, materials are obtained which may still be very satisfactory in normal practice, depending on the conditions of temperature and humidity.

It will be understood, of course, that where the material is to be used for flour bleaching purposes or other purposes where a white or colorless product is desired, carbon black cannot be used as a lumping inhibitor. The selection of the proper substances throughout depends, of course, in each case on the purpose for which the resulting product is to be used.

The term "oil absorption value" or "high absorption value" as used throughout the present specification and claims signifies the value in cc. as determined by the Gardner-Coleman method, per 100 grams of material being tested.

As many modifications of the invention may be made, it is understood that it is not to be limited except as defined by the appended claims.

We claim:

1. A free-running, substantially nonlumping composition comprising an organic peroxide, a major quantity of hydrated calcium sulphate, and a minor quantity of a lumping inhibitor having an oil absorption value about 80, said lumping inhibitor being taken from the class consisting of calcium carbonate magnesium carbonate, alumina hydrate, carbon black, tricalcium phosphate and silica gel.

2. The composition of claim 1 characterized in that said organic peroxide is an acyl peroxide and that said lumping inhibitor is taken from the class consisting of calcium carbonate, magnesium carbonate, alumina hydrate, carbon black, tricalcium phosphate and silica gel.

3. A free-running, substantially nonlumping composition, comprising an organic peroxide, a major quantity of hydrated calcium sulphate and a minor quantity of a lumping inhibitor comprising alumina hydrate having an oil absorption value above 80.

4. A free-running, substantially nonlumping composition comprising an acyl peroxide, a major quantity of hydrated calcium sulphate, and a minor quantity of a lumping inhibitor comprising magnesium carbonate having an oil absorption value not substantially below 200.

5. A free-running, substantially nonlumping composition comprising benzoyl peroxide, a major quantity of hydrated calcium sulphate, and a minor quantity of a lumping inhibitor comprising magnesium carbonate having an oil absorption value not substantially below 200.

FRANCISCUS VISSER'T HOOFT.
HUGH B. HODGE, JR.

---

CERTIFICATE OF CORRECTION.

Patent No. 2,207,737.     July 16, 1940.

FRANCISCUS VISSER'T HOOFT, ET AL.

It is hereby certified that error appears in the printed specification of the above numbered patent requiring correction as follows: Page 2, second column, line 27, for the word "possible" read --possibly--; page 3, first column, line 6, for "40" read --40%--; and second column, line 2, claim 1, for "about" read --above--; line 4, same claim, after "carbonate" insert a comma; and that the said Letters Patent should be read with this correction therein that the same may conform to the record of the case in the Patent Office.

Signed and sealed this 3rd day of September, A. D. 1940.

(Seal)            Henry Van Arsdale,
                 Acting Commissioner of Patents.

CERTIFICATE OF CORRECTION.

Patent No. 2,207,737. July 16, 1940.

FRANCISCUS VISSER 'T HOOFT, ET AL.

It is hereby certified that error appears in the printed specification of the above numbered patent requiring correction as follows: Page 2, second column, line 27, for the word "possible" read --possibly--; page 3, first column, line 6, for "40" read --40%--; and second column, line 2, claim 1, for "about" read --above--; line 4, same claim, after "carbonate" insert a comma; and that the said Letters Patent should be read with this correction therein that the same may conform to the record of the case in the Patent Office.

Signed and sealed this 3rd day of September, A. D. 1940.

(Seal)

Henry Van Arsdale,
Acting Commissioner of Patents.